United States Patent
Wurthner et al.

(10) Patent No.: US 8,321,102 B2
(45) Date of Patent: Nov. 27, 2012

(54) METHOD FOR CONTROLLING A DRIVE TRAIN OF A MOTOR VEHICLE

(75) Inventors: Maik Wurthner, Friedrichshafen (DE); Werner Wolfgang, Ravensburg (DE); Ingo Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 501 days.

(21) Appl. No.: 12/528,152

(22) PCT Filed: Feb. 21, 2008

(86) PCT No.: PCT/EP2008/052101
§ 371 (c)(1),
(2), (4) Date: Aug. 21, 2009

(87) PCT Pub. No.: WO2008/107309
PCT Pub. Date: Sep. 12, 2008

(65) Prior Publication Data
US 2010/0324790 A1    Dec. 23, 2010

(30) Foreign Application Priority Data
Mar. 2, 2007    (DE) .......................... 10 2007 010 295

(51) Int. Cl.
G06F 19/00          (2011.01)

(52) U.S. Cl. .......................................... 701/54; 701/67
(58) Field of Classification Search .............. 701/51–54, 701/67, 68
See application file for complete search history.

(56) References Cited

U.S. PATENT DOCUMENTS

| | | | |
|---|---|---|---|
| 6,287,237 B1 * | 9/2001 | Graf et al. ......................... | 477/94 |
| 6,415,214 B2 | 7/2002 | Nishimura et al. | |
| 6,878,095 B2 * | 4/2005 | Shigyo ............................. | 477/86 |
| 6,939,265 B2 * | 9/2005 | Rustige et al. ................... | 477/84 |
| 6,939,268 B2 * | 9/2005 | DeVore et al. ................. | 477/175 |
| 2004/0138027 A1 * | 7/2004 | Rustige et al. ................ | 477/175 |
| 2005/0060077 A1 * | 3/2005 | Slayton et al. .................. | 701/51 |
| 2006/0047395 A1 * | 3/2006 | Ikeya et al. ..................... | 701/51 |
| 2006/0240943 A1 * | 10/2006 | Winkel et al. .................. | 477/70 |
| 2007/0043495 A1 * | 2/2007 | Bates et al. ..................... | 701/51 |

FOREIGN PATENT DOCUMENTS

| | | |
|---|---|---|
| DE | 197 23 393 A1 | 12/1997 |
| DE | 199 52 623 A1 | 5/2001 |
| DE | 101 21 389 C1 | 8/2002 |

(Continued)

*Primary Examiner* — Dalena Tran
*Assistant Examiner* — Jason Holloway
(74) *Attorney, Agent, or Firm* — Davis & Bujold, PLLC

(57) ABSTRACT

A method for controlling a drive train of a motor vehicle comprising a drive engine, an automated transmission, and an automated clutch arranged in the force flow between the drive engine and the transmission. In order to achieve low component wear, a comfortable coasting operation mode and a spontaneous transition into the traction mode, it is provided that additional coast downshifts are prevented as soon as the driving speed ($v_F$) of the motor vehicle has reached or dropped below a previously defined threshold speed ($v_{Gr}$) for coast downshifts ($v_F \leq v_{Gr}$), or the currently engaged gear ($G_i$) corresponds to a previously defined limit gear ($G_{Gr}$) for coast downshifts ($G_i = G_{Gr}$) and, after dropping below the threshold speed ($v_{Gr}$) or after engaging the limit gear ($G_{Gr}$), a transition into the traction mode is prepared by determining a current target gear ($G_Z$) and an associated shifting speed ($n_S$) of an adaptive shift for the transition into the traction mode as a function of the driving speed ($v_F$) of the motor vehicle and/or the engine speed ($n_M$) of the drive engine.

8 Claims, 2 Drawing Sheets

FOREIGN PATENT DOCUMENTS

| | | |
|---|---|---|
| DE | 102 21 701 A1 | 11/2002 |
| DE | 103 34 930 A1 | 2/2005 |
| DE | 10 2004 030 198 A1 | 2/2006 |
| EP | 1 044 843 A2 | 10/2000 |
| EP | 1 134 111 A2 | 9/2001 |
| GB | 2 313 886 A | 12/1997 |

* cited by examiner

METHOD FOR CONTROLLING A DRIVE TRAIN OF A MOTOR VEHICLE

This application is a National Stage completion of PCT/EP2008/052101 filed Feb. 21, 2008, which claims priority from German patent application serial no. 10 2007 010 295.1 filed Mar. 2, 2007.

FIELD OF THE INVENTION

The invention relates to a method for controlling a drive train of a motor vehicle comprising a drive engine, an automated transmission, and an automated clutch arranged in the force flow between the drive engine and the transmission, wherein the drive engine can be controlled, by means of an engine control unit, and the transmission can be controlled together with the clutch, by means of a transmission control unit, and both control units are connected, via data and sensor lines, to one another and to at least one speed sensor, an actuating sensor of a gas pedal, and an actuating sensor of a brake pedal, wherein in the coasting mode automatic coast downshifts are carried out at least as a function of the current driving speed and the current engine speed, and wherein an adaptive shift for transition into the traction mode is carried out at the latest upon actuation of the gas pedal.

BACKGROUND OF THE INVENTION

Modern motor vehicles increasingly use automated clutches and automated transmissions in the drive train because in this way, on the one hand, reductions in fuel consumption and pollutant emissions and, on the other hand, an increase in driving comfort of the respective motor vehicles can be achieved. The clutch and the transmission are, in general, respectively controlled via an electronic transmission control unit which is supplied with information data regarding current driving and operating parameters of the motor vehicle, such as the engine speed and the load of the drive engine, the speeds of the input shaft and output shaft, as well as the engaged gear of the transmission, the degree of engagement of the clutch, and the degree of actuation of the gas pedal and of the brake pedal, where the data is processed into control commands that are conducted to the gear actuators of the transmission, the clutch actuator, and the engine control unit of the drive engine for carrying out starting and shifting operations.

Equivalent power trains are known, for example, from DE 197 23 393 A1, DE 199 52 623 A1, DE 101 21 389 C1, and DE 102 21 701 A1. DE 197 23 393 A1 which describe such a drive train and a control method for this drive train, wherein the clutch actuator for engaging and disengaging the clutch and/or the gear actuators for engaging and disengaging the gears of the transmission are configured as electric motors. The subject matter of DE 199 52 623 A1 is a method for controlling an equivalent drive train, wherein the engagement of the clutch is delayed until the speed of the drive engine is equal to the speed of the input shaft of the transmission, independently of the actuation of the gas pedal. In another method according to DE 101 21 389 C1 for controlling such a drive train, a load surge in the drive train caused by disengaging under load is prevented by adapting the engine torque of the drive engine, before disengaging the clutch, thereby making disengagement more comfortable. DE 102 21 701 A1 describes a method for controlling an equivalent drive train having a hydraulic clutch actuator according to which the engagement of the clutch, for ending a coasting mode of operation, is carried out in a particularly rapid and low-jerk manner by previously adapting the engine speed of the drive engine to the speed of the transmission input shaft.

SUMMARY OF THE INVENTION

The present invention is based on a coasting operation mode of a motor vehicle provided with such a drive train. In this operating phase, the driver has released the gas pedal and optionally actuates the brake pedal below an actuating limit at which emergency braking would occur with an automatic opening of the clutch. The fuel supply or fuel injection, at the drive engine of the vehicle, is completely cut off in the coasting operation mode (coasting fuel cutoff), or is at least significantly reduced, whereby a high drag torque of the drive engine is achieved, by which the motor vehicle is decelerated by the tractive resistance of the motor vehicle and, if applicable, by the braking torque of the service brake.

In the coasting operation mode, the shift program of the transmission control unit triggers and carries out automatic coast downshifts, at least as a function of the current driving speed and the current engine speed. Since the gear ratio steps are becoming increasingly larger in relation to the smaller gears, the coast downshifts are carried out with increasingly stronger shift pressure and, therefore, become more and more uncomfortable. As the retardation continues to increase as the driving speed decreases, particularly in the event of an actuation of the service brake, in addition to the shifting sequence of the coast downshifts increases, so that the clutch is hardly engaged any more, and therefore the braking action by the drag torque of the drive engine tends to zero.

Furthermore, the high number of shifts and the high shifting sequence are disadvantageously associated with high wear of the clutch and gear couplings of the transmission. In addition, usually an adaptive shift in the form of a downshift is required for the transition, from the coasting operation mode to the traction mode, which the driver can trigger by actuating the gas pedal, in order to bring the drive engine to a higher speed and to output a correspondingly high engine torque in conjunction with an activation or increase in the fuel injection. As the shifting frequency increases with decreasing driving speed, the target gear of the adaptive shift can frequently not be determined rapidly enough, as a result of which the adaptive shift is carried out with noticeable time delay.

Against this background, the object underlying the present invention is to provide a method for controlling a drive train of the type mentioned above, by means of which a lower wear and more comfortable coasting operation mode and a spontaneous transition into the traction mode are possible in a corresponding motor vehicle.

This object is attained by a method for controlling a drive train of a motor vehicle comprising a drive engine, an automated transmission, and an automated clutch arranged in the force flow between the drive engine and the transmission, wherein the drive engine can be controlled by means of an engine control unit and the transmission can be controlled together with the clutch by means of a transmission control unit, and both control units are connected to one another via data and sensor lines, and to at least one speed sensor, an actuating sensor of a gas pedal, and an actuating sensor of a brake pedal, wherein in the coasting operation mode automatic coast downshifts are carried out at least as a function of the current driving speed $v_F$ and the current engine speed $n_M$, and wherein an adaptive shift for transition into the traction mode is carried out at the latest upon actuation of the gas pedal $x_{FP} > 0$.

In addition, with this method according to the invention it is provided that additional coast downshifts are prevented as soon as the driving speed $v_F$ of the motor vehicle has reached or dropped below a previously defined threshold speed $v_{Gr}$ for coast downshifts ($v_F \leq v_{Gr}$), or the currently engaged gear $G_i$ corresponds to a previously defined limit gear $G_{Gr}$ for coast downshifts $G_i = G_{Gr}$, and that, after dropping below the threshold speed $v_{Gr}$, or after engaging the limit gear $G_{Gr}$, a transition into the traction mode is prepared while a current target gear $G_z$ and an associated shifting speed $n_S$ of an adaptive shift for the transition into the traction mode are determined as a function of the driving speed $v_F$ of the motor vehicle and/or the engine speed $n_M$ of the drive engine.

Advantageous embodiments and further developments of the method according to the invention are the subject matter of the dependent claims.

Since no further coast downshifts are carried out any longer after dropping below the threshold speed $v_{Gr}$ defined for coast downshifts, or after engaging the limit gear defined for coast downshifts, the coast downshifts between the smaller gears associated with high gear ratio steps are eliminated. Accordingly, also the load surges associated therewith in the drive train, and/or longer slipping phases of the clutch, are avoided. The coasting operation mode of the motor vehicle, therefore, causes less wear of the materials and is more comfortable. As a result of the early determination of a current target gear and an associated shifting speed of an adaptive shift for a transition into the traction mode, the change from the coasting operation mode into the traction mode can be spontaneously carried out at any time by the driver upon a corresponding actuation of a driving control element, such as the brake or the gas pedal, and with a load change that is controlled to be relatively quick and with low impact.

For the specific control of the coasting operation mode, after dropping below the threshold speed or after engaging the limit gear, and, if necessary, the transition into the traction mode, according to the invention, two variants of the method are provided.

In a first variant of the method, it is provided that, upon reaching the respective shifting speed $n_s$, a shift into the currently determined target gear $G_z$ of the respective adaptive shift is carried out, wherein the clutch in each case is only partially engaged and held in the slip mode until the transition into the traction mode ($0 < x_K < 1$, with $x_K$ being the degree of engagement of the clutch). With such gear tracking, the target gear defined for a transition into the traction mode is already engaged, so that the transition into the traction mode can be carried out quickly and comfortably, at any time, by completely engaging the clutch and the control unit of the drive engine.

In this connection, it is accepted that via the slip operation of the clutch, with a tolerable thermal load, only relatively small drag torque of the drive engine can be transmitted to the driving wheels. Likewise, the shifting frequency resulting from the constant gear tracking has a disadvantageous effect on the service life of the shifting elements of the transmission, such as gear couplings and gear actuators. If a malfunction occurs in the transmission and clutch control units, a clutch that can be passively engaged is automatically engaged, whereas a clutch that can be actively engaged is optionally disengaged and has to be engaged in the emergency mode by an energy accumulator and held engaged at least for a limited time period, for example, in order to safely leave a hazard zone.

The transition into the traction mode is preferably carried out such that the clutch is completely engaged ($x_K = 1$) and the fuel supply to the drive engine is switched on or increased as soon as a deflection of the gas pedal out of the idle position ($x_{FP} > 0$), as actuation of the gas pedal by the driver is detected via the sensors. The chronological sequence of the engagement of the clutch and of the torque build-up of the drive engine occurs in the generally known manner as a function of the deflection of the gas pedal, and optionally the deflection speed of the gas pedal.

In a second variant of the method, it is provided that the gear $G_i$ last engaged in the coasting operation mode remains engaged until a deflection of the gas pedal out of the idle position $x_{FP} > 0$, that is to say an actuation of the gas pedal by the driver, is detected via sensors, and that a shift is then carried out into the currently determined target gear $G_z$ of the respective adaptive shift, the clutch is completely engaged ($x_K = 1$), and the fuel supply to the drive engine is switched on or increased.

In this variant of the method, the driving clutch is permanently engaged, so that higher drag torque of the drive engine can be transmitted to the driving wheels, and the drive train is in a safe operating state if a malfunction occurs. As a result of the reduced shifting frequency, compared to the first variant of the method, the shifting elements of the transmission, such as the gear couplings and gear actuators, are subject to less wear thereby increasing the service life of the transmission. The disadvantage accepted, in this case, is that during the transition into the traction mode, a complete adaptive shift has to be carried out, which is associated with a time-delayed implementation of the transition into the traction mode.

However, an acceleration of the transition into the traction mode can also be achieved, with this variant of the method, in that during a previous actuation of the service brake ($x_{BP} > 0$), a shift into the current target gear of the respective adaptive shift is carried out, and the clutch is at least partially engaged as soon as it is detected, via sensors, that the brake pedal has reached the idle position ($x_{BP} = 0$), that is to say that the driver has released the brake pedal. In this way, a smooth transition, from the second variant of the method into the first variant of the method, is accomplished. Accordingly, after releasing the brake pedal, gear tracking in the current target gear $G_z$ of the respective adaptive shift for the transition into the traction mode is carried out until the driver actuates the gas pedal ($x_{FP} > 0$) and thereby triggers the complete engagement of the clutch ($x_K = 1$) and the transition into the traction mode.

A variation possibility thereto is a one-time gear tracking shift, triggered by the release of the brake pedal.

In order to also enable stronger retardation by means of the service brake (emergency braking) within the coasting operation mode, it is advantageous that the clutch is completely disengaged, if necessary a shift into the current target gear of the respective adaptive shift is carried out, and the fuel supply to the drive engine is switched on or increased, as soon as the sensors detect that a previously defined threshold brake pressure is exceeded by the brake pedal ($x_{FP} > x_{FP\_Gr}$) and/or a previously defined threshold brake pressure of the service brake ($p_{Br} > p_{Br\_Gr}$) is exceeded. Alternatively or additionally, this may also take place as soon as corresponding signals from wheel speed sensors trigger activation of an anti-lock braking system (ABS). By completely disengaging the clutch, the drag torque of the drive engine is taken from the driving wheels, thereby enabling better proportioning of the braking force, via the brake pedal, and full functionality of the ABS system. Provided this is not already the case, a continuous shift into the target gear of an adaptive shift is carried out, as a function of the speed for a transition into the traction mode, wherein the target gear is a starting gear in the event of vehicle standstill or a very low driving speed. By switching on or increasing the fuel supply, the drive engine, previously driven by the transmitted drag torque, is kept running, that is to say stalling of the drive engine is prevented.

In this respect, it is also advantageous if the clutch is completely disengaged, if necessary switched into a starting gear, and the fuel supply to the drive engine is switched on or increased as soon as a drop below a previously defined minimum speed of the motor vehicle ($v_F < v_{Min}$) and/or a previously defined minimum speed of the drive engine ($n_M < n_{Min}$) is detected via the sensors.

BRIEF DESCRIPTION OF THE DRAWINGS

To illustrate the invention, a drawing with exemplary embodiments is annexed to the description.

The drawings show.

DETAILED DESCRIPTION OF THE PREFERRED EMBODIMENTS

Figure 1:
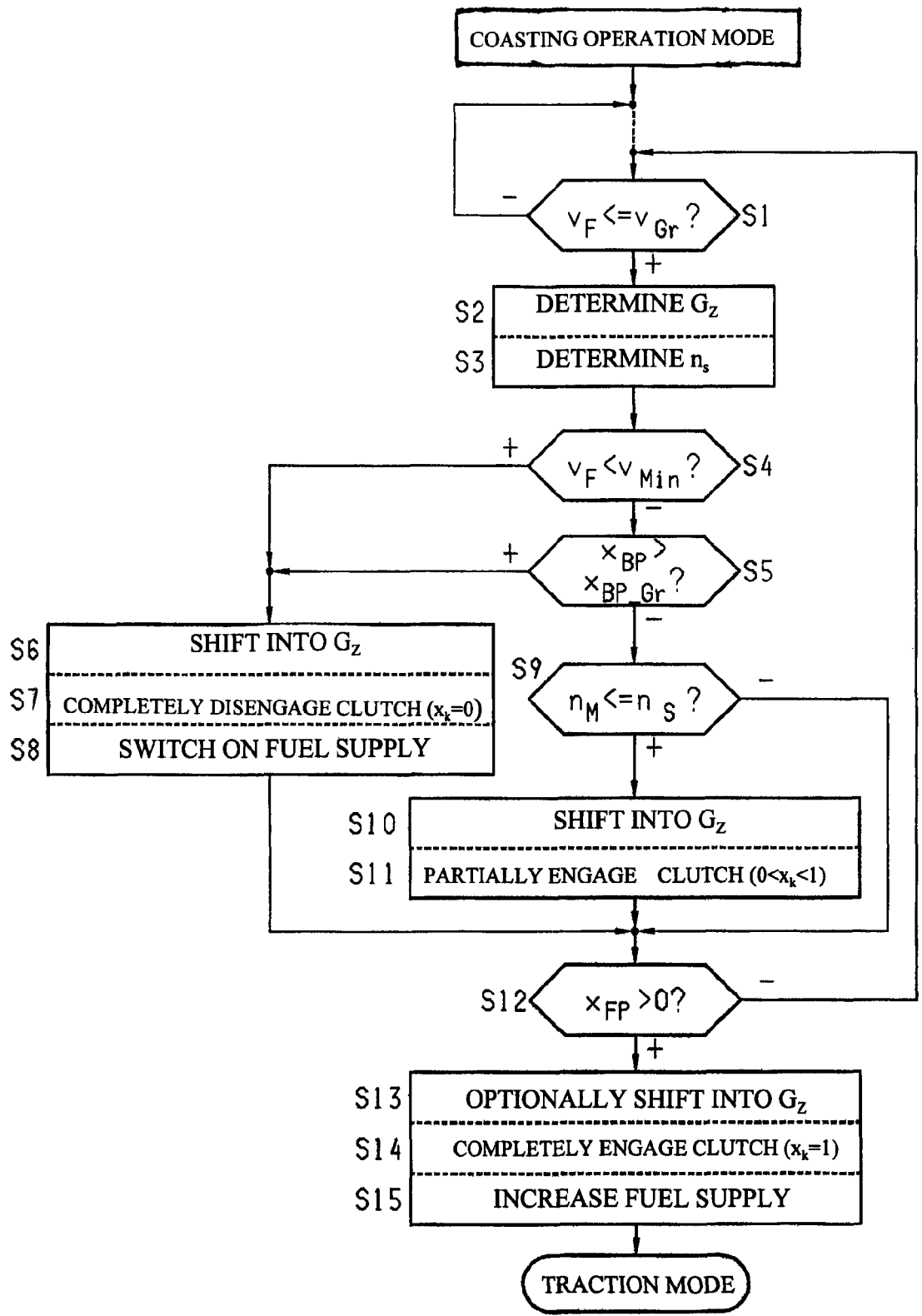
FIG. 1 is a flow chart of a first variant of the control method according to the invention.

In a first variant of the method according to FIG. 1, within the flow process of a coasting operation mode, preferably after carrying out a coast downshift or a coast upshift, in step S1 it is checked whether the current driving speed $v_F$ of the motor vehicle has reached, or dropped below, a previously defined threshold speed $v_{Gr}$ for coast downshifts ($v_F \leq v_{Gr}$). If this is not the case, a return back to the beginning of the coasting control takes place. If the condition according to step S1 is met, in step S2 the target gear $G_Z$ suitable for the current driving situation of an adaptive shift for a transition into the traction mode is determined, and the shifting speed $n_S$ associated with this gear for triggering the respective adaptive shift is determined, in step S3.

Thereupon, whether the current driving speed $v_F$ has dropped below a previously defined minimum speed $v_{Min}$ and the motor vehicle therefore drives at a low driving speed or is close to a standstill, is checked in step S4. If this condition is met, in steps S6 to S8, the previously determined target gear $G_Z$ is engaged, but in order to avoid stalling of the drive engine, the clutch is completely disengaged, which corresponds to an engagement degree $x_K$ of the clutch equal to zero ($x_K <= 0$), and the fuel supply to the drive engine is switched on or, if it was not completely switched off before, is accordingly increased. The same also occurs if, in step S5, an exceedance of a previously defined deflection threshold value $x_{BP\_Gr}$ is detected at the brake pedal ($x_{BP} > x_{BP\_Gr}$), which is considered as emergency braking.

In contrast, if none of the two conditions of S4 and S5 is met, in step S9 is checked whether the current engine speed $n_M$ has reached, or dropped below, the shifting speed $n_S$ previously determined in step S3. If this is the case, a shift into the target gear $G_Z$ of the adaptive shift is carried out, in step S10, but at first the clutch is only partially engaged ($0 < x_K < 1$), after step S11, in order to continue to use drag torque of the drive engine for the retardation of the motor vehicle.

Thereafter, in step S12, which is also carried out if the shifting speed $n_S$ has not yet been reached or the value has dropped below this speed, if the value has dropped below the minimum speed $v_{Min}$, and the limit position $x_{BP\_Gr}$ of the brake pedal has been exceeded, it is checked whether actuation of the gas pedal exists ($x_{FP} > 0$). If this is the case, in step 13 a shift into the target gear $G_Z$ of the adaptive shift is carried out, provided this has not yet happened, and subsequently, in step S14, the clutch is completely engaged, which corresponds to an engagement degree $x_K$ of the clutch equal to one ($x_K = 1$), and the fuel supply to the drive engine is increased in accordance to the gas pedal deflection $x_{FP}$ or, if it was previously completely switched off, it is switched on and then accordingly increased.

Thereupon, changing into the traction mode control and/or into the start-up control, if the driving speed is low, takes place. As long as the gas pedal has not yet been actuated ($x_{FP} = 0$), a return back to step S1 takes place such that upon a retardation of the motor vehicle to below the threshold speed $v_{Gr}$, continuous shifting into the current target gear $G_Z$ of the respective adaptive shift is carried out, and the clutch is held in a slipping mode ($0 < x_K < 1$), provided that a sufficiently high driving speed ($v_F \geq v_{Min}$) and a moderate actuation of the service brake ($x_{BP} \leq x_{BP\_Gr}$) are present.

Figure 2:
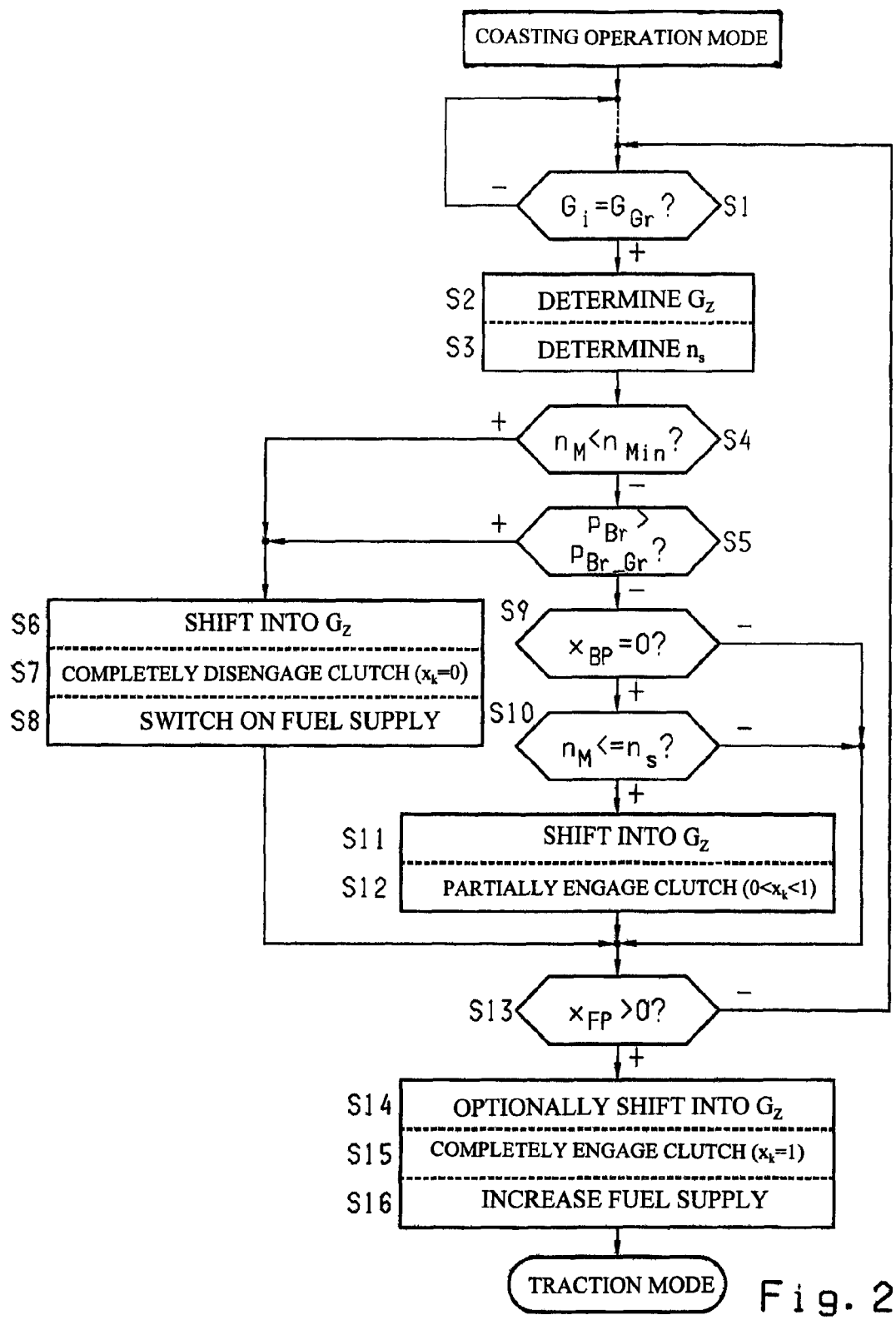
FIG. 2 is a flow chart of a second variant of the control method according to the invention.

In a second variant of the method according to FIG. 2, instead of checking whether a value has dropped below a threshold speed $v_{Gr}$, in step S1 is checked whether in the preceding coast downshift a previously defined limit gear $G_{Gr}$ for coast downshifts was engaged ($G_i = G_{Gr}$). If this is not the case, a return back to the beginning of the coasting control takes place. If the condition is met, the target gear $G_Z$ suitable for the current driving situation of an adaptive shift for a transition into the traction mode is determined, in step S2, and the shifting rotational speed $n_S$ associated with this gear for triggering the respective adaptive shift is determined, in step S3.

Thereupon, in step S4 is checked whether the current engine speed $n_M$ has dropped below a previously defined minimum speed $n_{Min}$ and thus the drive engine is about to stall. If this condition is met, the previously determined target gear $G_Z$ is engaged, in steps S6 to S8, but in order to avoid stalling of the drive engine, the clutch is completely disengaged ($x_K = 0$), and the fuel supply to the drive engine is switched on and/or, if it was previously not completely switched off, is accordingly increased. The same also occurs if, in step S5, an exceedance of a previously defined brake pressure threshold value $p_{Br\_Gr}$ of the service brake is detected ($p_{Br} > p_{Br\_Gr}$), which is considered as emergency braking.

In contrast, if none of the two conditions S4 and S5 is met, in step S9 is checked whether no actuation of the brake pedal exists ($x_{BP} = 0$). If this is the case, whether the current engine speed $n_M$ has reached, or dropped below, the previously determined rotational speed $n_S$ is checked, in subsequent step S10. If this is true, a shift into the target gear $G_Z$ of the adaptive shift is carried out, in step S11, but the clutch at first is only partially engaged ($0 < x_K < 1$), after step S12, in order to continue to use a drag torque of the drive engine for the retardation of the motor vehicle. If the brake pedal, however, is still being actuated ($x_{BP} > 0$), the shift into the target gear $G_Z$ of the adaptive shift and the partial engagement of the clutch are omitted at first.

In all cases, whether an actuation of the gas pedal exists ($x_{FP} > 0$) is subsequently checked, in step S13. If this is the case, a shift into the target gear $G_Z$ of the adaptive shift is carried out, provided this has not yet happened, in step 14, and the clutch is subsequently completely engaged ($x_K = 1$), in step S15, and the fuel supply to the drive engine is increased in accordance with the gas pedal deflection $x_{FP}$ and/or, if it was previously completely switched off, it is switched on and then increased accordingly. Thereupon, changing into the traction mode control and/or into the start-up control, if the driving speed is low, takes place As long as the gas pedal, however, has not been actuated ($x_{FP} = 0$), in each case a return back to step S1 takes place, such that during a retardation of the motor vehicle, to below the threshold speed $v_{Gr}$, a shift into the target gear $G_Z$ of the adaptive shift is avoided as long as the engine speed $n_M$ does not drop below the minimum speed $n_{Min}$ ($n_M \geq n_{Min}$), the brake pressure $p_{Br}$ of the service brake does not exceed the brake pressure threshold $p_{Br\_Gr}$ ($p_{Br} \leqq p_{Br\_Gr}$), the brake pedal is actuated ($x_{BP}>0$), and the gas pedal is not actuated ($x_{FP}=0$).

In other words, in the second variant of the method, after engaging the limit gear $G_{Gr}$ or, which is equivalent, after a value has dropped below the threshold speed $v_{Gr}$ within the defined operating limits prior to actuation of the gas pedal, a shift into the previously determined target gear $G_Z$ of the adaptive shift is only carried out if the driver releases the brake pedal when actuating the service brake, or if he does not use the service brake at all, during this phase. In this way, frequent shifting operations and extended slipping phases of the clutch are avoided, compared to the first variant of the method according to FIG. 1. Both variants of the method result in a relatively low-wear and comfortable coasting operation mode and enable a spontaneous transition into the traction mode.

Reference Numerals $G_{Gr}$ Limit gear
$G_i$ Currently engaged gear
$G_Z$ Target gear
$n_M$ Engine speed of the drive engine
$n_{Min}$ Minimum speed of the drive engine
$n_s$ Shifting speed
$p_{Br}$ Brake pressure of the service brake
$p_{Br\_Gr}$ Brake pressure threshold of the service brake
S1-S16 Steps of the method
$v_F$ Driving speed of the motor vehicle
$v_{Gr}$ Threshold speed
$v_{Min}$ Minimum speed of the motor vehicle
$x_{BP}$ Brake pedal travel, deflection of the brake pedal
$x_{BP\_Gr}$ Deflection threshold of the brake pedal
$x_{FP}$ Gas pedal travel, deflection of the gas pedal
$x_K$ Engagement degree of the clutch

The invention claimed is:

1. A method for controlling a drive train of a motor vehicle comprising a drive engine, an automated transmission, and an automated clutch, arranged in a force flow between the drive engine and the transmission, the drive engine being controllable by an engine control unit and the transmission, together with the clutch, being controllable by a transmission control unit, both the engine and the transmission control units being connected to one another, via data and sensor lines, and to at least one speed sensor, an actuating sensor of a gas pedal, and an actuating sensor of a brake pedal, the method comprising the steps of:

entering a coasting operation mode by performing, with a transmission controller, the steps of,
verifying the gas pedal is unactuated,
verifying the brake pedal is one of unactuated and actuated less than an actuating limit at which emergency braking occurs and the clutch automatically disengages, and
verifying that the clutch is engaged and the motor vehicle is decelerating by a tractive resistance of the drive engine;

while in the coasting operation mode:
carrying out automatic coast downshifts as a function of at least one of a current driving speed ($v_F$) and a current engine speed ($n_M$),
preventing coast downshifts when at least one of:
the current driving speed ($v_F$) of the motor vehicle reaches or is below a previously defined threshold speed ($v_{Gr}$) for coast downshifts ($v_F \leq v_{Gr}$), and
a currently engaged gear ($G_i$) corresponds to a previously defined limit gear ($G_{Gr}$) for coast downshifts ($G_i = G_{Gr}$), and carrying out an adaptive shift for a transition into a tractive mode upon actuation of the gas pedal ($x_{FP}>0$) and when one of the current driving speed ($v_F$) is below the threshold speed ($v_{Gr}$) and the limit gear ($G_{Gr}$) is engaged, and
preparing for a transition into the traction mode by determining a current target gear ($G_Z$) and an associated shifting speed ($n_S$) of an adaptive shift for the transition into the traction mode, as a function of at least one of the driving speed ($v_F$) of the motor vehicle and the engine speed ($n_M$) of the drive engine.

2. The method according to claim 1, further comprising the step of, upon reaching the respective shifting speed ($n_S$), carrying out a shift into the currently determined target gear ($G_Z$) of the respective adaptive shift with the clutch, in each case, only being partially engaged and held in a slipping mode until transition into the traction mode ($0<x_K<1$).

3. The method according to claim 2, further comprising the step of completely engaging the clutch ($x_K=1$) and, as soon as deflection of the gas pedal out of the idle position ($x_{FP}>0$) is detected by way of at least one of the sensors, one of switching on and increasing the fuel supply to the drive engine.

4. The method according to claim 1, further comprising the step of leaving the gear ($G_i$), last engaged in the coasting operation mode, engaged until deflection of the gas pedal out of an idle position ($x_{FP}>0$) is detected via at least one of the sensors, and then carrying out a shift into a currently determined target gear ($G_Z$) of the respective adaptive shift, with the clutch completely engaged ($x_K=1$) and a fuel supply to the drive engine one of switched on and increased.

5. The method according to claim 4, further comprising the step of, upon a prior actuation of the service brake ($x_{BP}>0$), carrying out a shift into the current target gear of the respective adaptive shift with the clutch at least partially engaged upon detection, via at least one of the sensors, that the brake pedal reaches the idle position ($x_{BP}=0$).

6. The method according to claim 1, further comprising the step of completely disengaging the clutch, if necessary, carrying out a shift into the current target gear of the respective adaptive shift and one of switching on and increasing a fuel supply to the drive engine as soon as the at least one of the sensors detect that one of:
a previously defined deflection threshold value is exceeded by the brake pedal ($x_{BP}>x_{BP\_Gr}$), and
a previously defined brake pressure threshold of the service brake ($p_{Br}>p_{Br\_Gr}$) is exceeded.

7. The method according to claim 1, further comprising the step of completely disengaging the clutch, if necessary, carrying out a shift into the current target gear of the respective adaptive shift and one of switching on and increasing a fuel supply to the drive engine as soon as a corresponding sensor signal of a wheel speed sensor triggers activation of an antilock braking system (ABS).

8. A method according to claim 1, further comprising the step of completely disengaging the clutch, if necessary, carrying out a shift into a starting gear and one of the switching on and increasing a fuel supply to the drive engine as soon as at least one of the sensors detect that a value has dropped below one of:
a previously defined minimum speed of the motor vehicle ($v_F<v_{Min}$), and
a previously defined minimum speed of the drive engine ($n_M<n_{Min}$).

* * * * *